(12) United States Patent
Malanov et al.

(10) Patent No.: US 8,250,655 B1
(45) Date of Patent: Aug. 21, 2012

(54) RAPID HEURISTIC METHOD AND SYSTEM FOR RECOGNITION OF SIMILARITY BETWEEN MALWARE VARIANTS

(75) Inventors: Alexey V. Malanov, Moscow (RU); Vitaliy A. Kamlyuk, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 1460 days.

(21) Appl. No.: 11/622,546

(22) Filed: Jan. 12, 2007

(51) Int. Cl.
*G06F 12/14* (2006.01)
*H04L 29/06* (2006.01)

(52) U.S. Cl. ............................ 726/24; 713/165; 713/188

(58) Field of Classification Search ...................... 726/24
See application file for complete search history.

(56) References Cited

U.S. PATENT DOCUMENTS

| | | | |
|---|---|---|---|
| 5,613,002 A | 3/1997 | Kephart et al. | |
| 5,878,050 A | 3/1999 | Brahme et al. | |
| 5,995,982 A | 11/1999 | Mercer | |
| 6,021,491 A | 2/2000 | Renaud | |
| 6,021,510 A * | 2/2000 | Nachenberg ............... | 714/38.14 |
| 6,738,932 B1 | 5/2004 | Price | |
| 6,990,600 B2 | 1/2006 | Ryan et al. | |
| 2002/0010459 A1 | 1/2002 | Whittier et al. | |
| 2002/0174349 A1 | 11/2002 | Wolff et al. | |
| 2004/0181561 A1 | 9/2004 | Knox et al. | |
| 2005/0021994 A1 | 1/2005 | Barton et al. | |
| 2005/0262567 A1 * | 11/2005 | Carmona ......................... | 726/24 |
| 2005/0278788 A1 | 12/2005 | Jindal et al. | |
| 2006/0015630 A1 * | 1/2006 | Stolfo et al. .................. | 709/230 |

* cited by examiner

*Primary Examiner* — Taghi Arani
*Assistant Examiner* — Mohammad L Rahman
(74) *Attorney, Agent, or Firm* — Bardmesser Law Group

(57) ABSTRACT

A system, method and computer program product for identifying new variants of certain data objects, for example, malware-carrying files, including (a) dividing a file into a plurality of N pieces; (b) for each of the N pieces, calculating an average value of bytes in that piece; (c) generating a furl of length N elements, wherein each element of the furl has a value that represents the average value of its corresponding file piece; (d) calculating the distance between the furl and a second furl that corresponds to the file known to contain malware; and (e) based on the distance, determining whether the file is likely to carry a malicious object. The malicious object is, for example, a trojan, a virus, a rootkit or a worm. The second furl can be selected by comparing file size, and taking into account whether the file is packed. The furl elements are bytes, words, half words, etc. The distance is calculated based on, e.g., the sum of absolute value differences, root mean square difference and a correlation coefficient. The average value is an arithmetic average and a geometric average.

16 Claims, 13 Drawing Sheets

RAPID HEURISTIC METHOD AND SYSTEM FOR RECOGNITION OF SIMILARITY BETWEEN MALWARE VARIANTS

BACKGROUND OF THE INVENTION

1. Field of the Invention

The present invention relates to recognition of similar (or slightly modified) data objects, such as files containing variants of malicious objects, file portions and byte sequences (with or without using some preprocessing procedure), and more particularly, to a system and method for a more rapid analysis of non-identical files/objects for presence of malware variants.

2. Description of the Related Art

One of the most important goals of modern antivirus and anti-malware programs is detection and identification of malicious data objects. These can take the form of viruses, rootkits, worms, trojans, and the like. The most common mechanism for detecting such objects is through signature comparison, where bit patterns in the file being analyzed are compared with the bit patterns of known malicious objects. Such detection is only possible if the bitwise comparison is exact.

A common problem faced by vendors of antivirus software is initial identification of a file that potentially—but only potentially—contains a malicious object. This is due to the fact that the same malicious object functionality can be achieved using a variety of methods, given the instruction sets of the most common processors, such as the Intel processor. For instance, consider the following source code fragment, written in C:

```
int i=0, j=0;
int main( )
{
  if (i==1000)
    return i;
  else
    return j;
}
``` and the second object code fragment, which is the C code fragment above compiled into Intel assembly language:

```
_main            proc near
mov              ecx, dword_414184
mov              eax, 3E8h
cmp              ecx, eax
jz               short locret_401124
mov              eax, dword_414180
locret_401124:
retn
_main            endp
```

It will be readily seen that minor changes in the C source code fragment, which do not affect the functionality at all, will result in a different compiled object code fragment. For example, when the if-condition changes from "if (i==1000)" to "if (i==999)", the C code fragment will compile into a different object code fragment. Also, the compiled object code fragment can be manipulated in numerous ways, to disguise the malicious object. For example, swapping i and j in the source code will result in a different object code fragment without changing the functionality. The addition of an NOP (no operation) instructions will result in a different compiled object code fragment. Such NOP instructions can be liberally and randomly sprinkled throughout the object code, producing in a vast variety of executable file signatures, all with the same functionality since the NOP instructions do not actually do anything.

There are other various mechanisms for disguising the malicious objects, such as rearranging the order of a handful of instructions, in the compiled object code where the order of execution of these instructions does not matter. Other mechanisms include using different registers in the object code (for example, in the Intel architecture, e.g., using a register other than the AX register, which may be used by the standard compiler).

Furthermore, by manipulating the compiled object code and in some cases the binary executable code, there might remain virtually no portions of code of sufficient length in the binary executable, to make meaningful comparisons for purposes of virus signature detection.

In sum, the signature method of detection of malicious object presence is relatively unstable, since trivial and non-functional variations in the malicious code result in different signatures. The practical consequence of this is that laborious manual intervention is required by an analyst to detect the appearance of a new variant of a virus or malicious object. Such manual labor can be relatively substantial, even when the ultimate conclusion is that the malicious object at issue is already available in the vendor's database, often in numerous variants.

Examples of conventional file comparison techniques in the field of anti-virus applications may be found, e.g., in U.S. Pat. No. 6,990,600, U.S. Pat. No. 6,738,932, U.S. Pat. No. 5,995,982, U.S. Pat. No. 6,021,491, U.S. Pat. No. 5,878,050, U.S. Patent Publication No. 2002/010459. However, all of these approaches rely on exact comparisons of the objects at issue and even a slightly modified variant cannot be detected by these conventional approaches.

Accordingly, there is a need in the art for a system and method for detection of similar data objects and files, and particularly malicious objects, that is sufficiently stable to recognize new variants of existing malicious objects, notwithstanding nonfunctional or cosmetic changes to the files being compared.

SUMMARY OF THE INVENTION

Accordingly, the present invention is directed to a system and method for a heuristic method and system for rapid identification of files containing variants of known objects that substantially obviates one or more of the disadvantages of the related art.

In one aspect of the invention, for example, applicable to the field of anti-virus analysis, there is provided a system, method and computer program product for identifying new variants of known malware-carrying files, including (a) dividing a file into a plurality of N pieces; (b) for each of the N pieces, calculating an average value of bytes in that piece; (c) generating a furl of length N elements, wherein each element of the furl has a value that represents the average value of its corresponding file piece; (d) calculating normalized distance ($K_N$) between the furl and a second furl that corresponds to a file known to be a malware file; and (e) based on the distance, determining whether the file is likely to carry a malicious object.

The malicious object can be represented by a trojan, a virus, a rootkit or a worm. The second furl is selected based on file size comparison, and taking into account whether or not the file is packed. The furl elements can be bytes, words (16 bits), double-words (32 bits), etc. The distance between the two furls is calculated based on, e.g., the sum of absolute value differences, root mean square difference and a correlation coefficient. The average value is normally an arithmetic or geometric average.

The absolute distance value ($K_A$) and normalized distance value ($K_N$) is calculated in terms of the equation $$K_A = \sum_{i=1}^{N} |\Delta n_i|,$$

$$K_N = \frac{K_A}{M*N}$$

where $n_i$ (also known as furl[i]) is the average value of the bytes of i-th piece of the file, $\Delta n_i$ is the difference between i-th elements of the furls, and M is a maximum possible value of each furl element. Alternatively, the distance ($K_N$) is calculated as:

$$K_N = \frac{K_A * D}{M * N^2}$$

where $n_i$ is the average value of the bytes of i-th piece of the file, $\Delta n_i$ is the difference between i-th elements of the furls, and D is a number of elements of the two furls that are different. $K_N$ is a real value from 0 to 1 and shows the normalized distance between two furls. The closer $K_N$ is to 1, the less the similarity of the source furls, and hence the files represented by the furls are dissimilar.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Generally, the discussion below is in the context of antivirus analysis, although it will be appreciated that the invention is not limited to this application and can be used to compare data objects and files in a more general context, e.g., text files, image files, executable files, etc.

Figure 1:
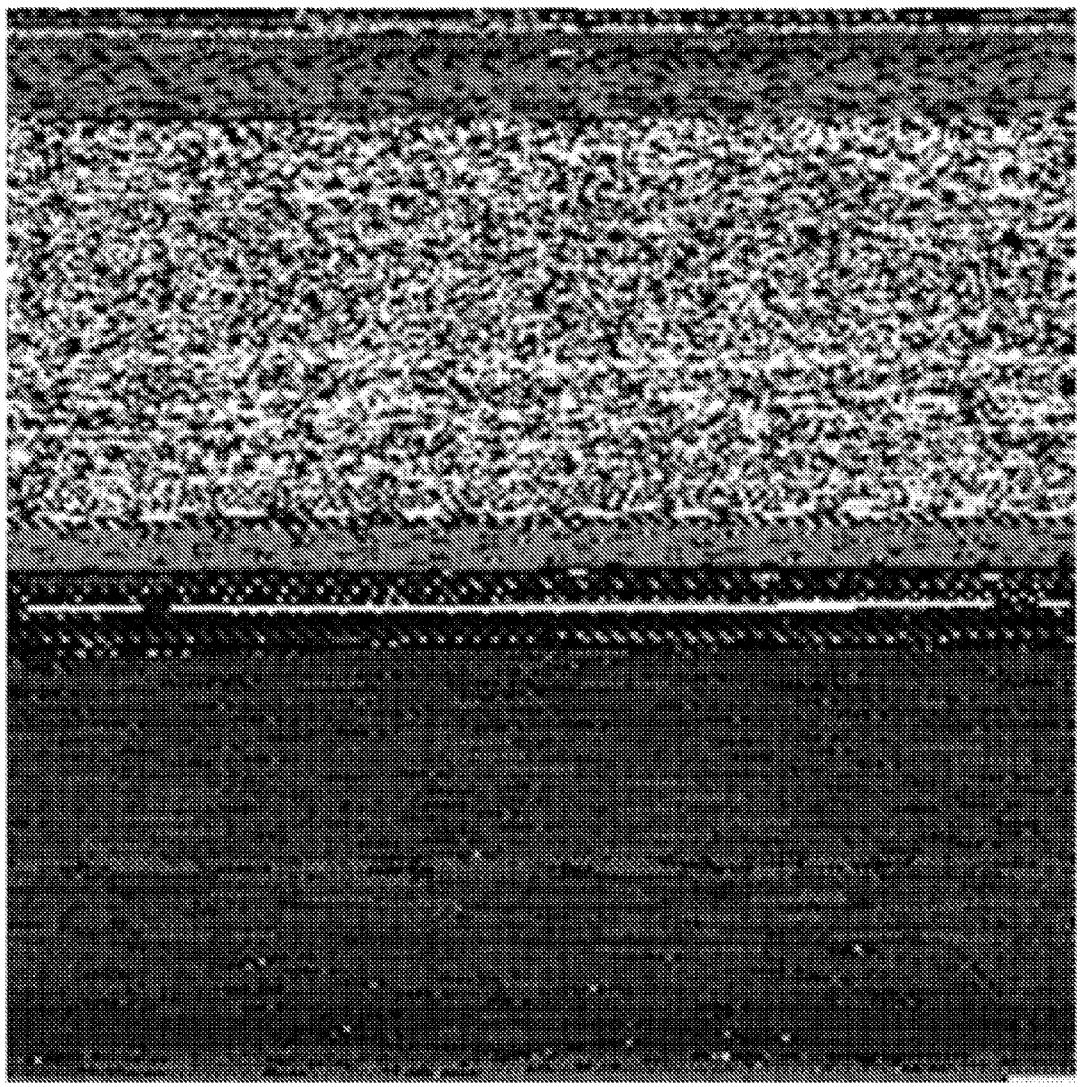
FIGS. 1-5 illustrate, in bitmap form, how executable files can be visually represented.

Understanding of the approach described herein can be aided through the use of graphical representation of several exemplary files. FIG. 1 is an example of such a graphical representation (a bitmap), and is an executable file named file1. In this type of image, each byte in the executable file is represented by a single pixel. A file that is 10,000 bytes in size is represented by an image of 100×100 pixels. Similarly, a file that is 40,000 bytes in size would be represented by an image that is 200×200 pixels. The intensity of each pixel corresponds to the numerical value of the byte, with black assigned to the value 0, and the brightest (white) pixels are those with the value 255. Various greytones in the image correspond to values between 0 and 255.

Thus, the image shown in FIG. 1 represents the executable file, File1, in a particular graphical format. The inventors have observed that many of the tricks that writers of malicious object code use to disguise the malicious objects result in relatively minor changes in such images as shown in FIG. 1. For example, addition of NOP codes, small changes in the order of some instructions, etc., will result in changes in the file. Nonetheless, the file's image retains the appearance substantially similar to what it had been before. Another way of approaching this is that for a particular family of malicious objects, many modifications of that family will look relatively similar if represented as this type of image, even though an attempt to identify them by signature analysis would usually fail.

Figure 2:
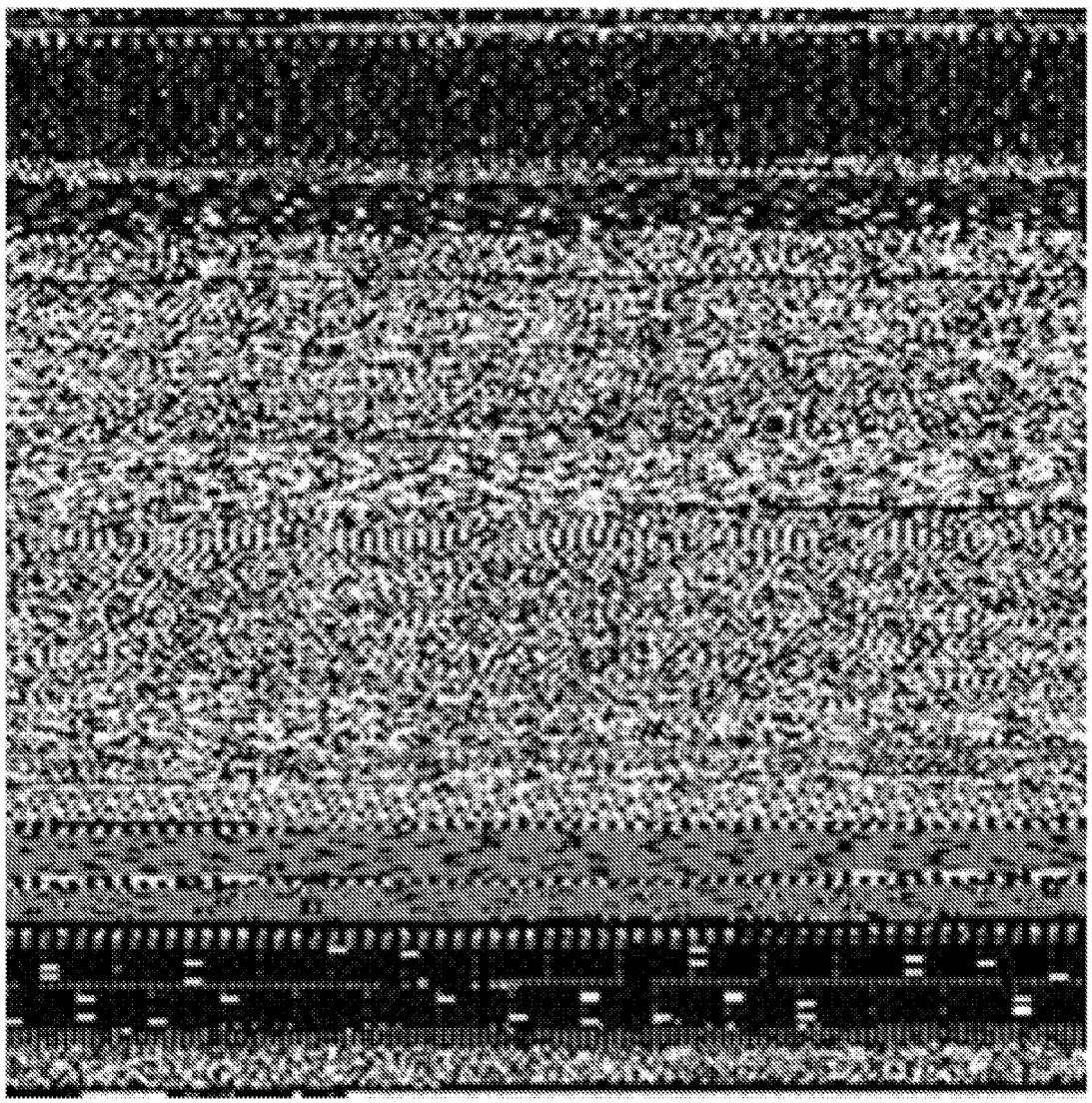

FIG. 2 is another example of such an image, in this case, the image of an executable File2 used by the spooler subsystem application. Note that the structure of this file is completely different from the structure of FIG. 1, and the difference is easily visible even to the naked eye. Similarly, FIG. 3, which shows File3, illustrates a completely different graphical structure.

Figure 4A:
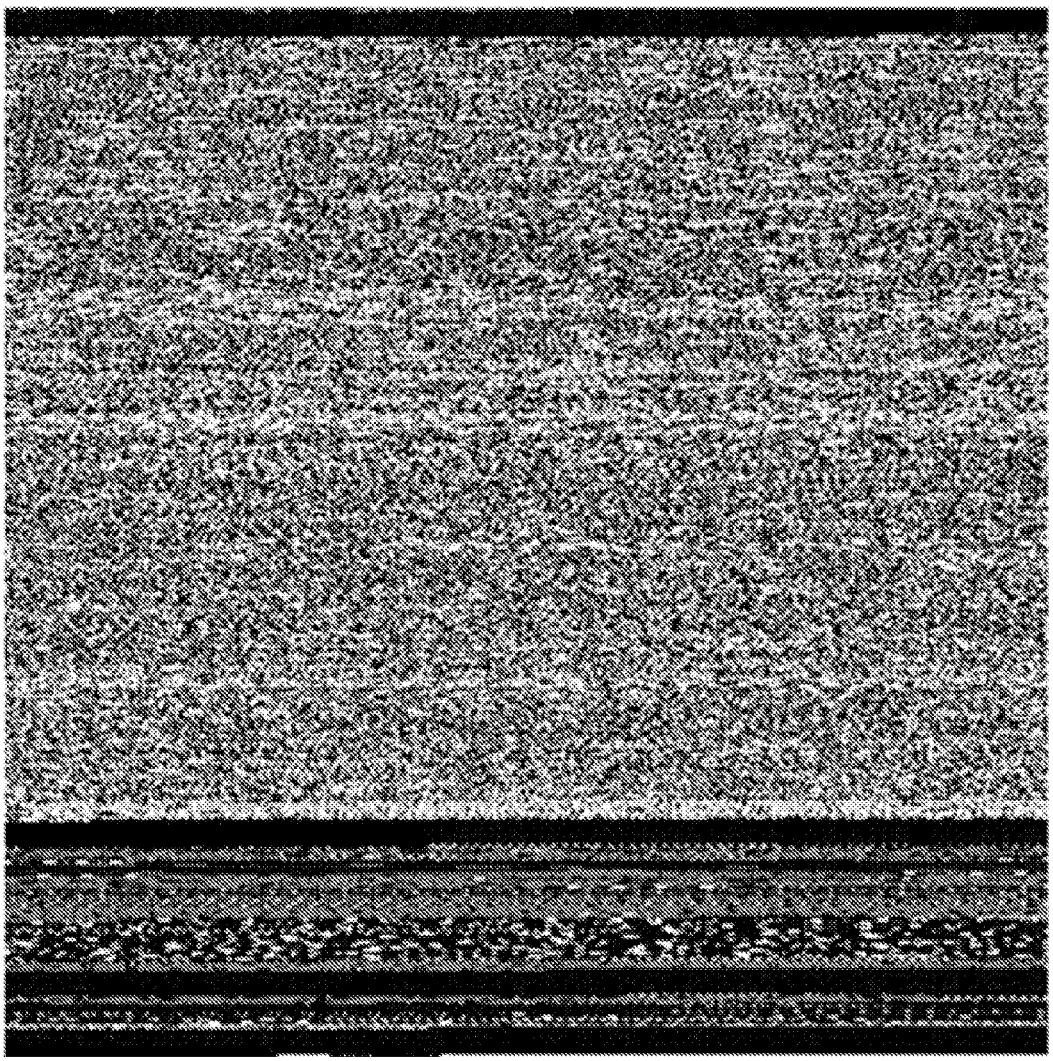
Figure 4B:
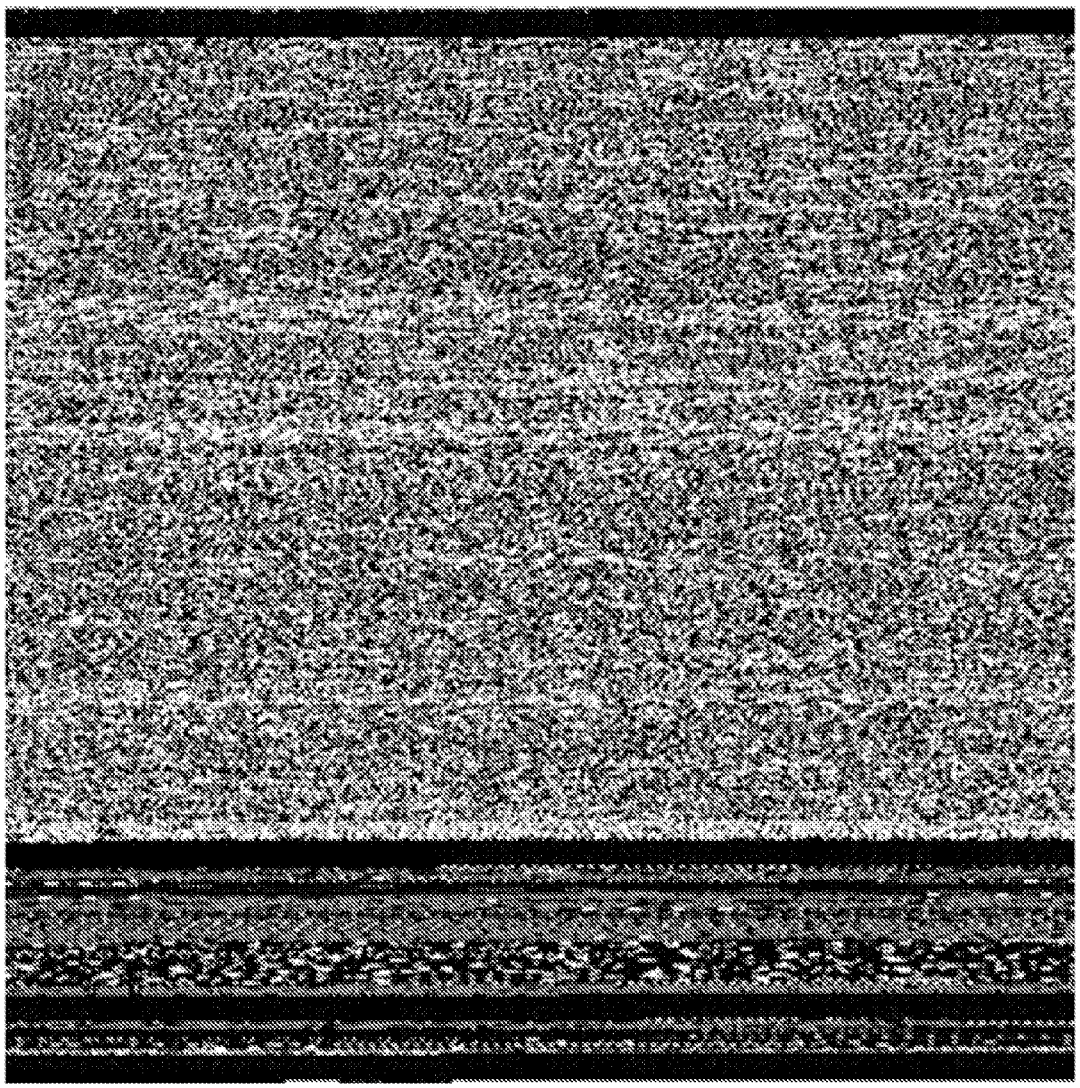
Figure 5:
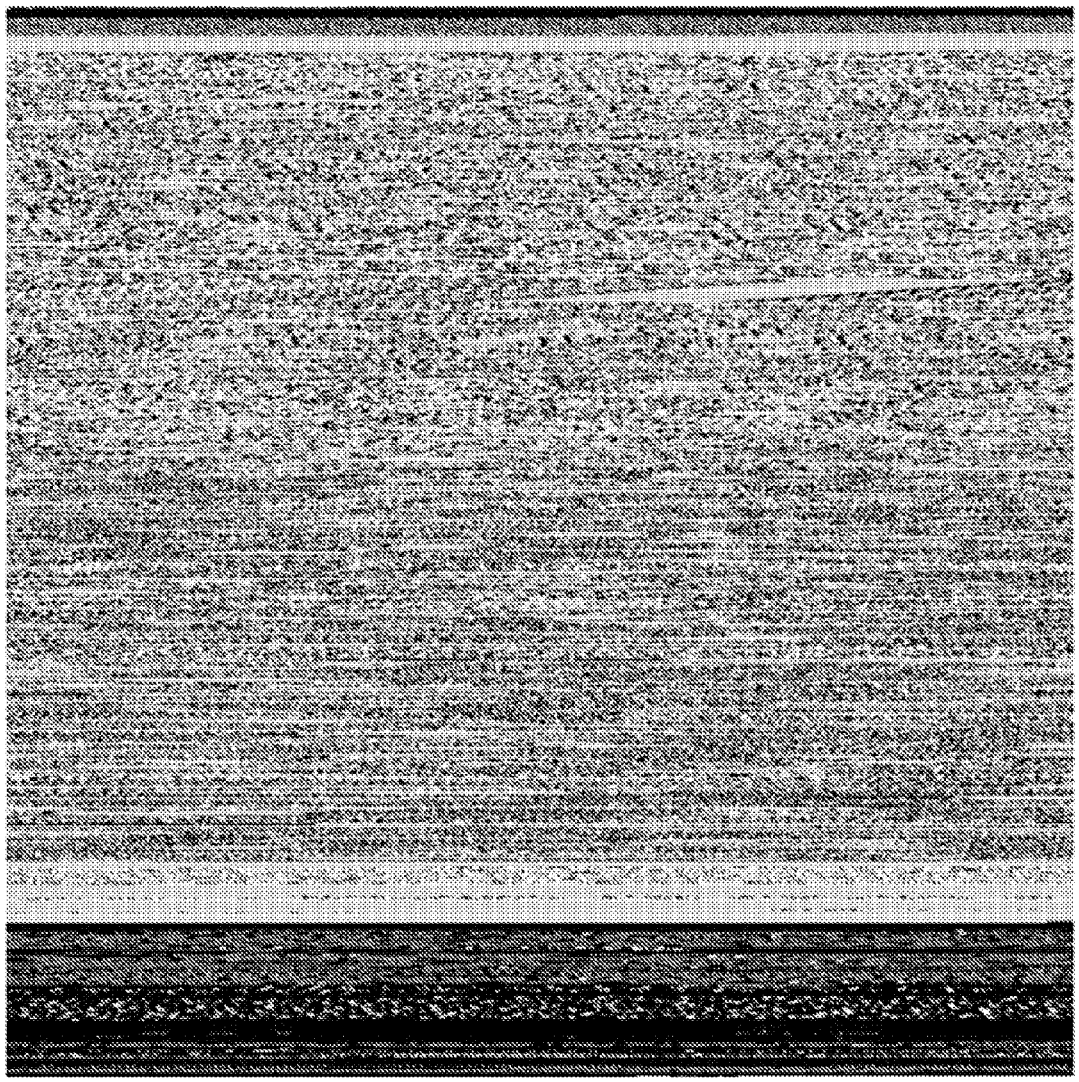

Different compilation procedures performed on the same file will usually result in different file structures. This may be seen in FIGS. 4A, 4B. FIG. 4A shows the image for the file, File4. FIG. 4B shows the same file, File4, with a different order of functions in the original C file, while FIG. 5 shows the same file, File4, but which was compiled in a debug mode, and again, the differences between FIG. 5 and FIG. 4A are clearly visible. This illustrates the principle that relatively minor and essentially non-functional changes to the source file result in en essentially similar structure, when represented in a graphical format such as in FIGS. 4A and 4B.

As will be readily appreciated, visually comparing such images as shown in FIGS. 1-5 is somewhat difficult on the analyst. Thus, it should be remembered that the images are used for illustration only, and any automated analysis system does not need to go through the intermediate step of generating the bitmap images, but can work with the raw data. Nevertheless, such two-dimensional graphic representations are useful for the purposes of focusing on the differences, or distance, between two files that have a similar (but not identical) structure. The question, therefore, is whether the structure is "similar enough" to conclude that the two non-identical files likely contain malicious objects that belong to the same family.

Thus, the relevant issue from the perspective of calculations is how close or how far the two files are, and how such a distance can be quantified. There are a number of possible metrics that can be used to determine distance between the files. One graphical comparison can involve the use of histograms, although it is understood that actual generation of such histograms is primarily a visual aid and need not be implemented in this exact form.

Consider the files represented by the images in FIGS. 4A and 4B. Such an image can be conceptually divided into a number N (here, N=100 is used as an example) of horizontal lines. Each line corresponds to a piece, or portion, of the file. If the image is 100×100 pixels (in other words, representing a file that is 100×100=10,000 bytes), then each such horizontal line is a line formed by 100 pixels, the topmost 100 pixels, then the second 100 pixels, etc. An arithmetic (or geometric) average value of the byte values of the several bytes of the file piece at issue can be calculated for each line. Alternatively, the sum of the values of all the bytes corresponding to each pixel can be calculated. Thus, for the first line, the sum of the first 100 bytes can be calculated, for the second line, the sum of the second 100 bytes can be calculated, etc. In essence, either approach results in similar outcomes, regardless of the normalization. If the file size does not evenly divide into N, extra bytes containing all zeros can be added at the end.

In the case of larger files, for example, a file that is 40,000 bytes in size, the first horizontal line is formed by 2 rows of pixels. The rest of the calculations are the same.

Figure 3:
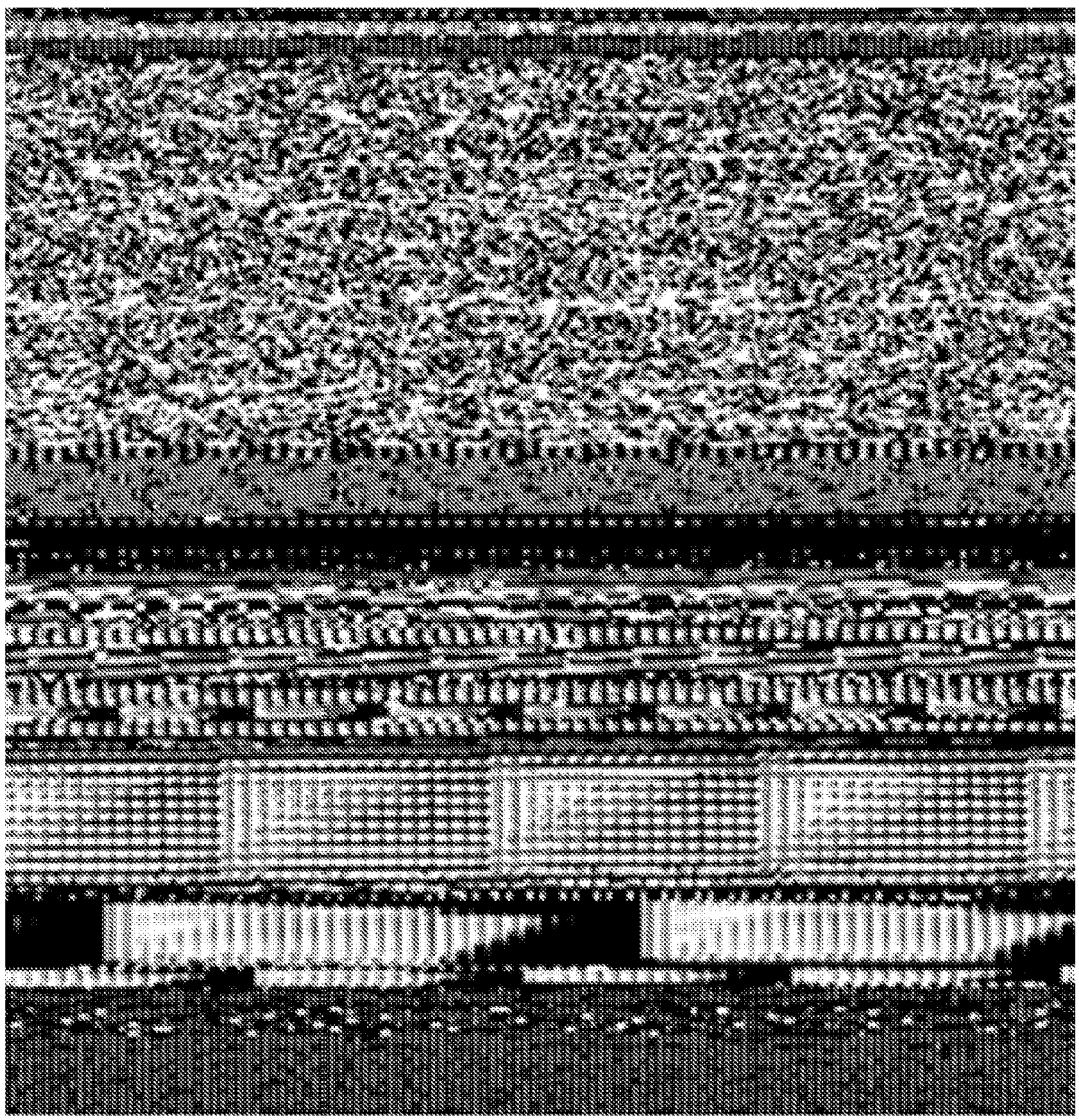
Figure 6:
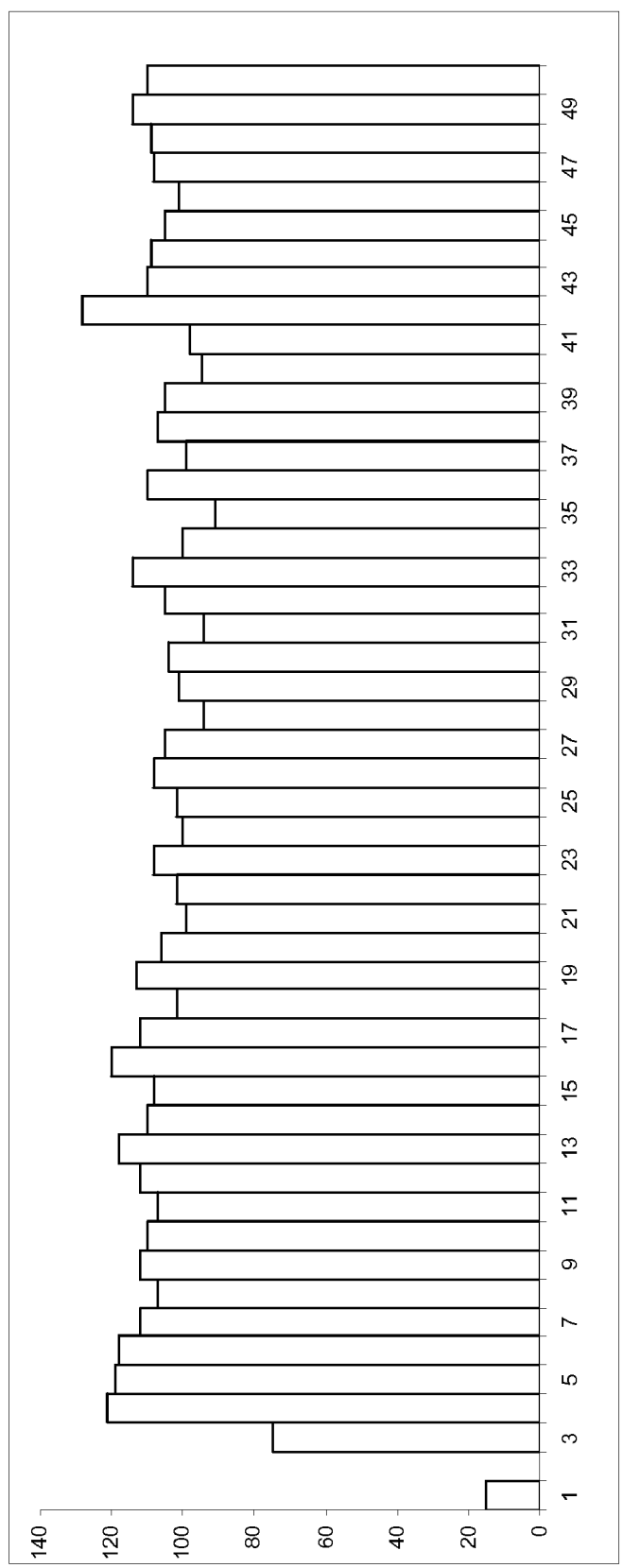
FIG. 6 illustrates a histogram of the furl represented by the graphical image of FIG. 2.

A histogram can be generated for the image, with each vertical bar of the histogram corresponding to each line, or each file piece. An exemplary histogram for the image of FIG. 3 is shown in FIG. 6. Histograms can be generated for the images in FIG. 4A and FIG. 4B and overlaid, for comparison.

Figure 7:
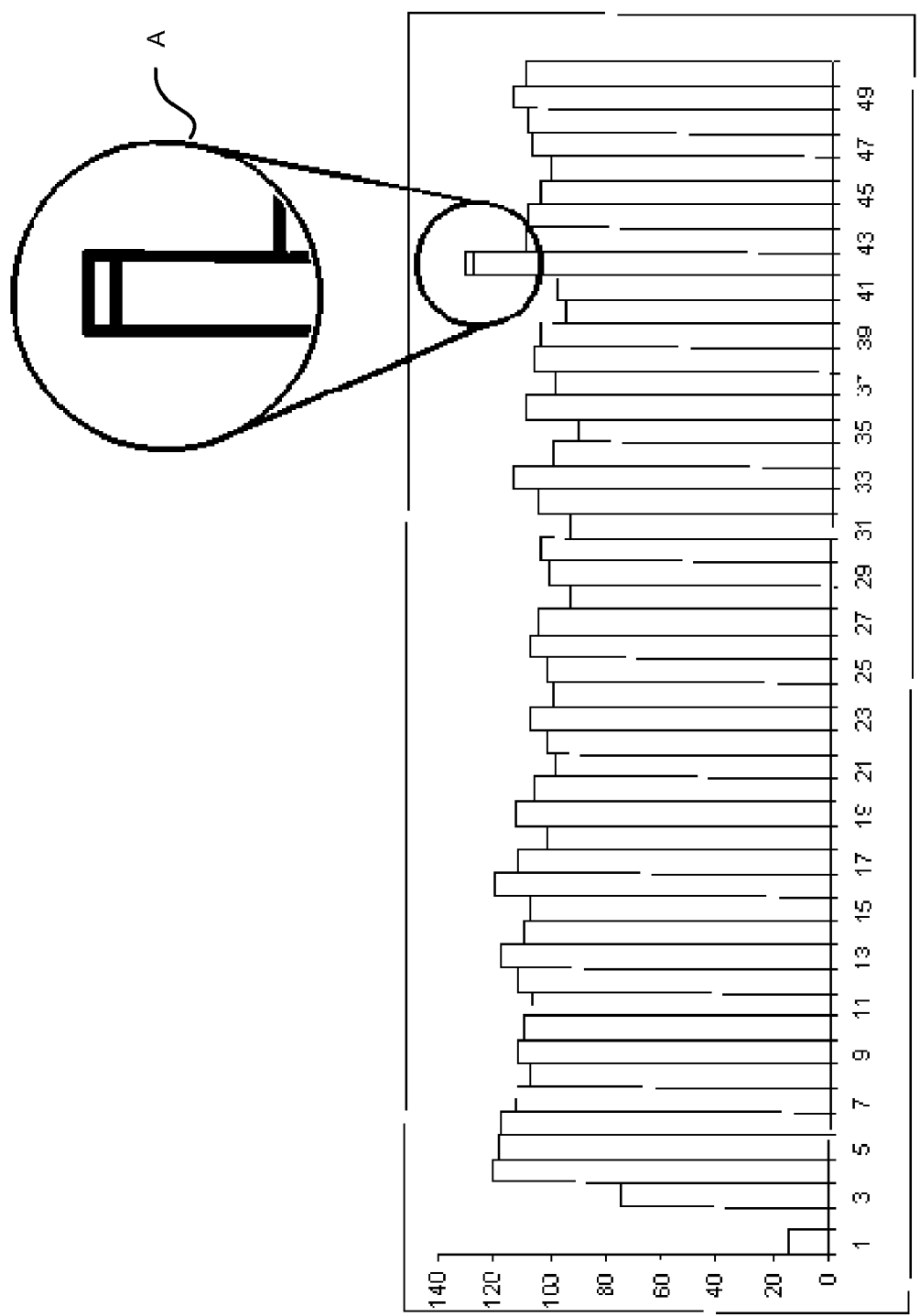
FIG. 7 illustrates a comparison, in histogram form, of the furls represented by the graphical images of FIGS. 3 and 4.

A comparison of the two histograms in FIG. 6 shows that they are similar to each other. The difference between them is quite small (see area "A" in FIG. 7), indicating that the files are virtually identical. If, for example, the file corresponding to FIG. 4A were a suspect file, and the file corresponding FIG. 4B were a file known to contain a malicious object, then the difference this small is a good indication that the file corresponding to FIG. 4A also contains a malicious object in the same family.

Figure 8:
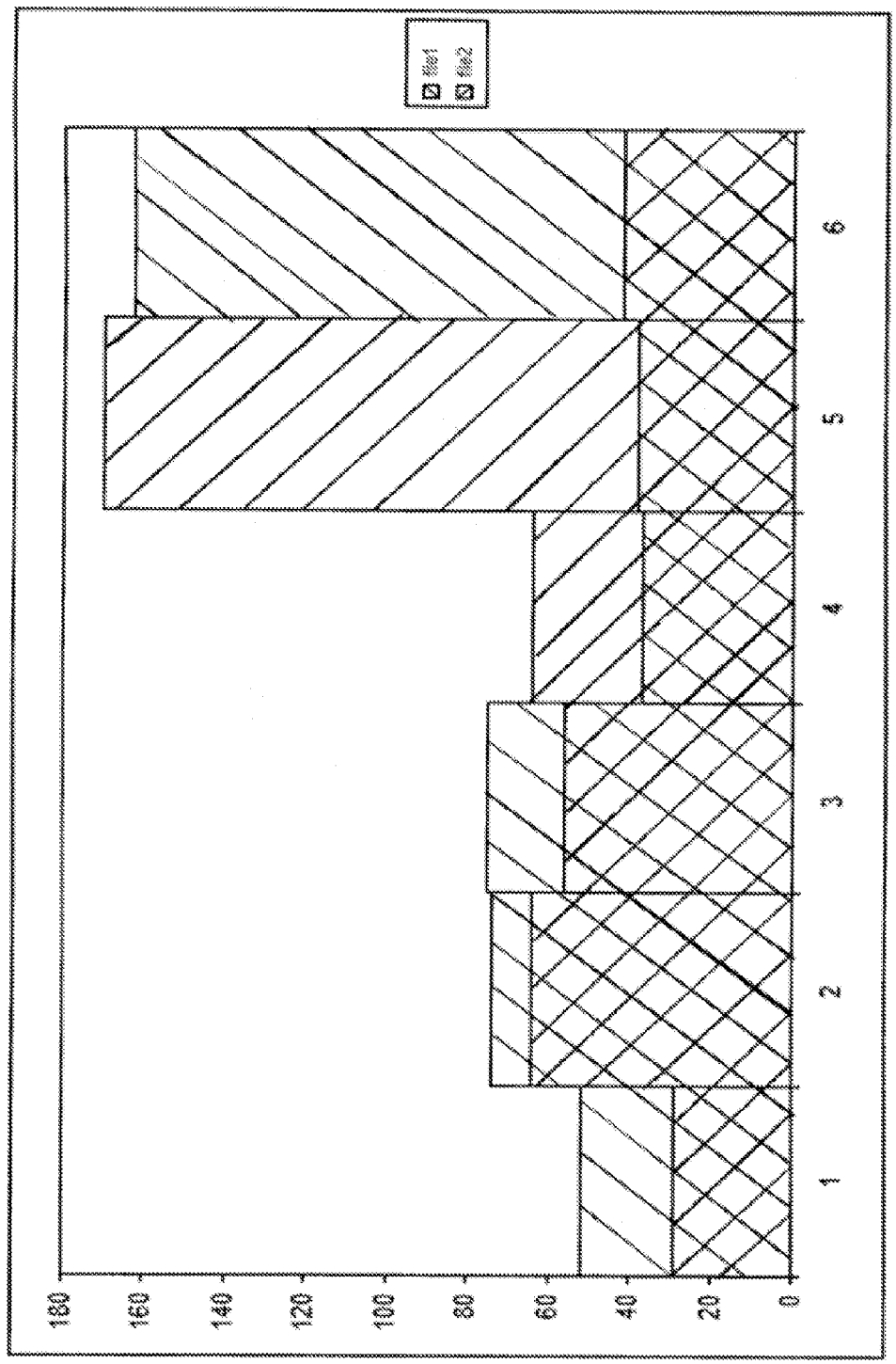
FIG. 8 illustrates a histogram showing a comparison of the furls represented by the graphical images of FIGS. 4A and 4B.

On the other hand, comparison of the files corresponding to FIG. 4A and FIG. 5, which is illustrated in histogram form in FIG. 8, shows that the files are significantly different, the difference between them is great enough to indicate the conclusion of similarity or closeness cannot be reached about these two files.

The approach described herein should be distinguished from conventional methods of verifying identity of files, such as hash functions or checksums. A typical checksum or hashing algorithm takes a file (or a sequence of bytes) and produces a value, such as a checksum value or a hash function value with the property that even a small change in the original file (a change of even a single bit) will result in a completely different output value. The objective of the present approach is different: the objective is to generate similar values for files that are in some sense similar, the most common example being different variants of the same malware object.

Just as one way functions, such as hashes or checksums, convert a file into a smaller value (such values are typically on the order of several bytes in size), the present approach also calculates a value, different from checksums, which will be referred to as a "furl." The furl is an N-dimensional vector, or a sequence of N bytes (or words, or double-words), whose graphical representation is the histogram described earlier. The value of each line/bar in the furl is the height of the corresponding vertical bar of the histogram. The question therefore becomes how to calculate a furl, based on the ideas described above, so that similar files have furls that are in a sense closely resemble each other, and dissimilar files with corresponding furls are different. Furthermore, a desirable property of the furl is that it must be the reasonably stable not only for minor changes in the values of the individual bytes in the original file from which the furl is calculated, but reasonably stable with respect to some changes in the sequence of the bytes in the original file.

The inventors empirically determined that a number N (the furl length) of approximately 100 tends to be optimal. A number N that is too small, for example, a few dozen, tends to pull in files that are substantially different as having relatively similar histograms and furls, in other words, a type of a false positive. A number N that is substantially larger than 100, for example, 200, or 1000, tends to show up in the histograms as having a relatively fine structure—in other words, small differences in the files that might not have functional significance would still show up in the histogram comparisons as having a relatively large distance, a type of a false negative. Thus, it has been experimentally determined that the optimum value of N is approximately between 80 and 120, preferably between 90 and 110, more preferably between 95 and 105, with the most preferred number of approximately 100.

Another way to describe this mathematically is to consider how one-way functions, such as hashes and checksums, treat so-called "collisions." A collision is a situation where the algorithm produces the same one-way function output value for different files. Such collisions are either unacceptable, or extremely undesirable, for virtually all applications that use one-way functions, if the original files that are being compared are not identical.

In the present case, the question is not how to avoid collisions, but rather how to control them. In other words, a controlled number of collisions is desirable for files similar to each other. A mathematical consequence of this is that a relatively small change in the original file should have only an insignificant impact on its corresponding furl.

It should also be noted that many currently used one-way functions, such as hashes, are relatively computation-intensive. Furthermore, although the number of many virus and trojan files, in the databases built up by many antivirus software vendors over the years, is in the hundreds of thousands of modifications, if every single variation of every single malware object (and malware-infected file) were to be kept in a database, such a database could easily number hundreds of millions, if not billions, of files, which is extremely large for any database, whose elements are files, and illustrates the impracticality, with the current technology, of maintaining such exhaustive databases of every variant of every malicious object.

Furthermore, the ability of virus writers and hackers to generate new variants of existing malicious objects, using the mechanisms described above, such as semi-random additions of NOP of codes, etc., is substantially greater than the ability of the hardware manufacturers to increase the speed of the hardware, to cope with the increasing number of malicious object variants. Therefore, there is no obvious hardware solution to this problem. Thus, there arises a need for a mechanism that permits comparing not the files, but instead a smaller derivative value, associated with a file, in this case, the furl.

It should also be noted that with the current technology, the most common application is a server-based solution, although, strictly speaking, there is no reason why local and/or remote user databases containing furls cannot be maintained as well.

Thus, what is necessary is an algorithm that determines similarity between two files where both the differences between the files are relatively small, and some of the differences are due to merely rearranging some portions of the code within the file, while generally maintaining the overall structure.

The following is a possible algorithm for calculation of the furl:

1. a level of granularity is selected, for example, byte-wise, word-wise, double-word-wise, etc. Generally, intermediate granularity values, such as 10-bit granularity, are more difficult to work with for most processors, although theoretically there is no practical reason why they cannot be used. Preferably, the unit of granularity fits exactly an integer number of times into the file pieces;

2. a set of bytes A is initialized, initially to empty, or all zeros. The number of bytes in the set A is equal to N;

3. the file is divided into N small pieces of the same length. The first piece (in the beginning of the file) is then selected;

4. an average arithmetic value of the bytes (or words, or double-words) is then computed, based on the current piece;

5. if the piece for which the average value is computed is not the last piece, then the next piece is selected, and step 4 is repeated;

6. the set A now represents the furl, which was graphically illustrated earlier in FIG. 6;

7. the set A, representing the furl, is saved to a database.

This algorithm can be implemented as follows (illustrated by a pseudocode):
Building a furl:
  int blocksize=filesize/N
  for i=0 to N−1
    furl[i]=average(file[i*blocksize], . . . , file[i*blocksize+blocksize−1])

Figure 12:
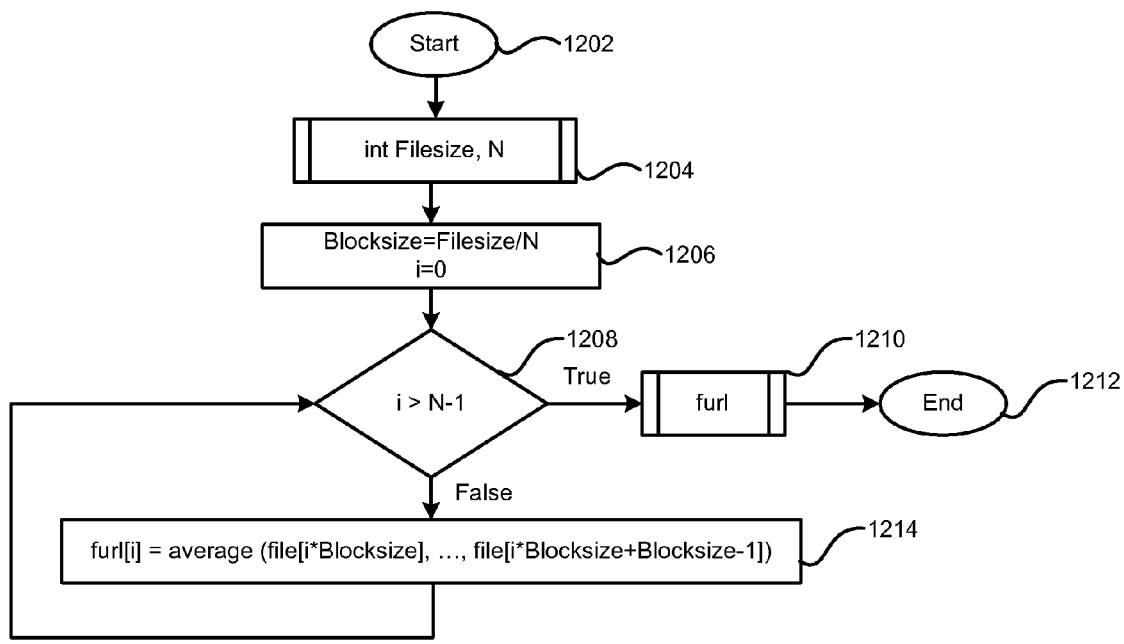
FIG. 12 illustrates an algorithm of calculating a furl.

FIG. 12 illustrates the process of calculating furls, in one embodiment of the invention. As shown in FIG. 12, after the start step (1202), the optimum parameters of the optimum parameter N (number of furl elements) is chosen, and in step 1204, the file to be analyzed is received, its size is identified, and an optimum furl vector size N is chosen. In step 1206, a block size (file piece size) is selected, and i initialized to 0. In step 1208, if i is less than N−1, then the i-th furl element is calculated by, for example, taking the average of the values of the bytes in the file piece. i is then incremented by 1. In step 1208, if the furl element values for each file piece has been calculated, then, in step 1210, the furl is ready to be saved to the furl database, and the process terminates in step 1212.

The following are the equations for calculating difference between furls based on the $\Delta n_i$, in one embodiment:

$$K_A = \sum_{i=1}^{N} |\Delta n_i|,$$

$$K_N = \frac{K_A}{M*N}$$

Where $n_i$ is the average value of the byte of i-th piece of the object (e.g., file) being analyzed, N is length of the furl, $\Delta n_i$ is the difference between i-th elements of the furls, $K_A$ is the total difference in weights of the objects being compared, an un-normalized value, $K_N$ is the sought-after normalized distance coefficient (the lower it is, the more similar are the two objects' structures).

This equation for $K_N$ shows how different the files are, relative to the "weight of the files. These equations can be implemented as follows (illustrated by a pseudocode):

Calculating the distance between two furls: distance(furl1, furl2):
  K=0
  For i=0 to N−1
    K=K+|furl1[i]−furl2[i]|

Searching for the nearest furl:
  minK initialized by the highest distance value
  for each furlDB
    if distance(furl, furlDB)<minK
      minK=distance(furl, furlDB)

Consider the number of differences between two furls. Two separate differences (in other words, two locations in the furls, which have the same length, but have two bytes that are different), i.e., differences in 2 elements of the furls with $\Delta=1$, and a difference in 1 furl element with $\Delta=2$ is an indication of two different types of similarity between two files. A maximum possible difference between two files can be considered to be M×N, and used in the equation:

$$K_A = \sum_{i=1}^{N} |\Delta n_i|,$$

$$K_N = \frac{K*D}{M*N^2}$$

where $n_i$ is the average value of the bytes of i-th portion of the object being considered (i.e., the value of the corresponding byte i of the furl), N is the length of the furl, $\Delta n_i$ is the difference between i-th elements of the furls, $K_A$ is the difference in weights of the objects being compared, $K_N$ is the normalized distance coefficient (the lower it is, the more similar are the two objects' structures), D is the number of differences encountered (when doing a byte-wise comparison of the furls, also equal to the number of non-zero $|\Delta n_i|$), M is the maximal value of furl element (255 for byte-wise furls). $K_N$ is a real number, which takes values between 0 and 1. In essence, this alternative calculation takes into account the fact that two furls where several furl bytes are different must be treated differently from the two furls where only a single byte is different, even if the normalized distance measurement is nominally the same.

Thus, if two files have significantly different headers, but are virtually identical as far as the remaining data in that file, then their similarity will be fairly pronounced. If the files have relatively small differences all along the furl, this likely indicates that the files are not similar, since some factor, such as noise, is affecting the file content. In other words, the shape of the histogram is relatively similar, and the height of the histogram vertical bars is relatively similar, but most of the values of the histogram bars are different from furl to furl. The use of the equation above will further highlight their differences, by considering the parameter D.

Figure 9:
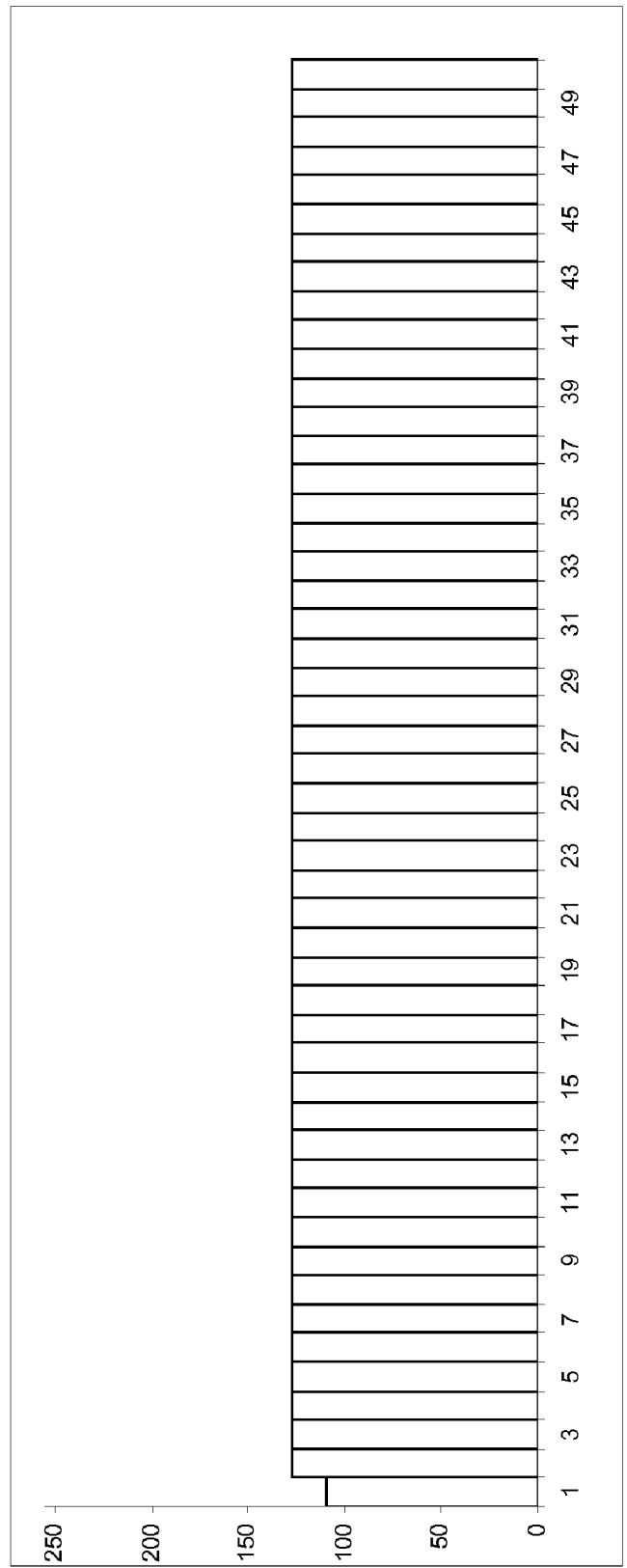
FIG. 9 illustrates an example of a furl of a file that is unsuitable for a furl-wise comparison.

It should also be noted that the approach described in current paper will work relatively poorly, if at all, on files that have a random, or a pseudo random structure. For example, compressed files (e.g., ZIP or RAR archives), encrypted files, etc. tend to present essentially random bit patterns for analysis. A bitmap image of such a file would consist of essentially random bytes. A furl of such a file would have an average value of 127, for each byte of the furl, rendering the comparison between the furls essentially meaningless. This is illustrated in FIG. 9.

Also large files that consist of all equal bytes (i.e., all zeroes), or contain 95-100% of equal bytes, are also poorly suited for the approach described herein, since the furls of such files will look similar, notwithstanding the fact that the relevant portions may or may not be similar.

Once the two furls are selected for comparison, there are several metrics that can be used. One such possible metric is the sum of the absolute values of the differences between elements of the furls being compared. Root mean square is another such possible metric. The use of correlation coefficients, such as known in statistics, can also be used to calculate the distance between two furls. For each approach, a particular value needs to be empirically determined as sufficiently borderline.

As will be appreciated, there are a number of ways of measuring distance. One is to add the absolute values of the differences of each furl element. In this case, a total difference of less than approximately 2-3% tends to indicate that the files are similar. Another way to calculate the distance is by calculating byte-wise root mean square differences between the furls. Still another way is to calculate correlation coefficients based on the furls. As will be appreciated, the correlation coefficients can be calculated based on the original raw data itself, however, with large files the process of calculating correlation coefficients between the suspect file and numerous other files is highly calculation intensive. On the other hand, calculating correlation coefficients based on relatively small vectors (for example, 100-byte furl vectors for N=100) is much less problematic and less time consuming. As such, it will be appreciated that the invention is not limited to any particular method of calculating the distance, although it is believed at the moment that a simple calculation of differences based on absolute value comparisons of each furl elements is sufficient and simplest for calculation purposes.

In order to optimize the process of looking for similar furls, it is generally preferable to compare files that are similar in size, on the assumption that the files are substantially different in size are not similar. Furthermore, the selection of files depends on whether or not the files have been packed, e.g., using some compression algorithm, such as Huffman, Arithmetic, Run Length Encoding (RLE), etc. For packed files, the similarity in size needs to be fairly close, somewhere within roughly 3-4% or less. For unpacked files, this requirement is substantially more relaxed, somewhere around plus or minus 50%, since many such unpacked files often contain large portions that are all zeros.

Figure 10:
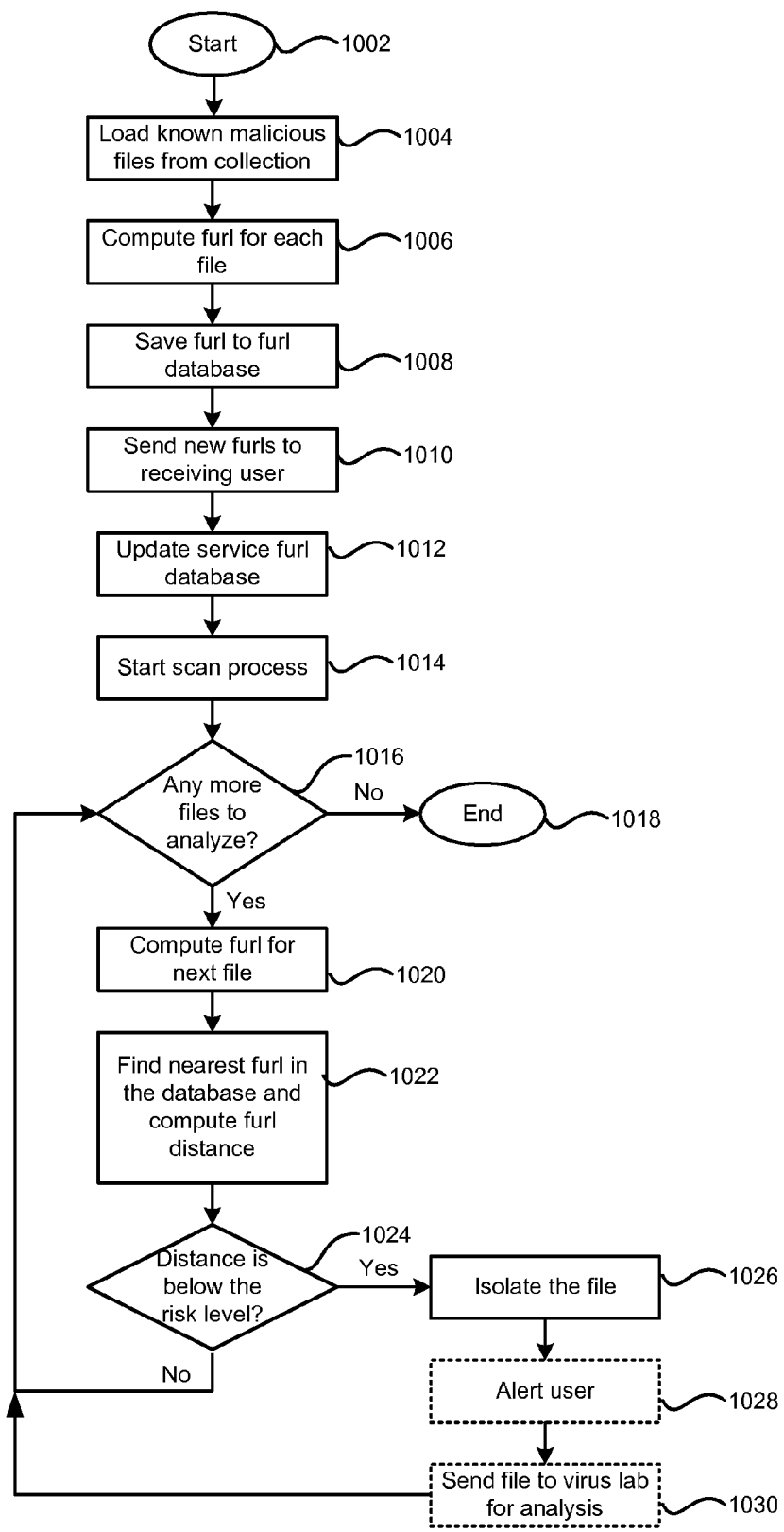
FIG. 10 illustrates the process of using furls to identify new variants of known malicious objects.

FIG. 10 illustrates the process of working with furls, particularly in the context of identifying malicious objects. As shown in FIG. 10, after the process starts in step 1002, files that are known to contain malicious objects are loaded from the collection or database of files (step 1004). In step 1006, for each such file, a furl is computed. In step 1008, the furls are saved to the database. In step 1010, new furls are sent to the user who requested the analysis. In step 1012, the service database containing furls is updated. In step 1014, the scanning process can begin. In step 1016, if there are no more files to analyze, the process terminates in step 1018. Otherwise, the furl is computed for the next file being checked for presence of malware (step 1020).

In step 1022, for the file at issue, the furl in the database that is closest to the furl of the file being analyzed is identified, and the distance is computed. In 1024, if the distance is below the risk level, then, in step 1026, the file is isolated. Optionally, the user is alerted, in step 1028, and the file can then be forwarded to the virus lab for analysis. The process can then return to step 1016, to analyze the remaining files. If, in step 1024, the distance between the furl of the file being analyzed and the nearest furl is sufficiently large, then the file does not likely contain a malicious object, and the process returns to step 1016.

Figure 11:
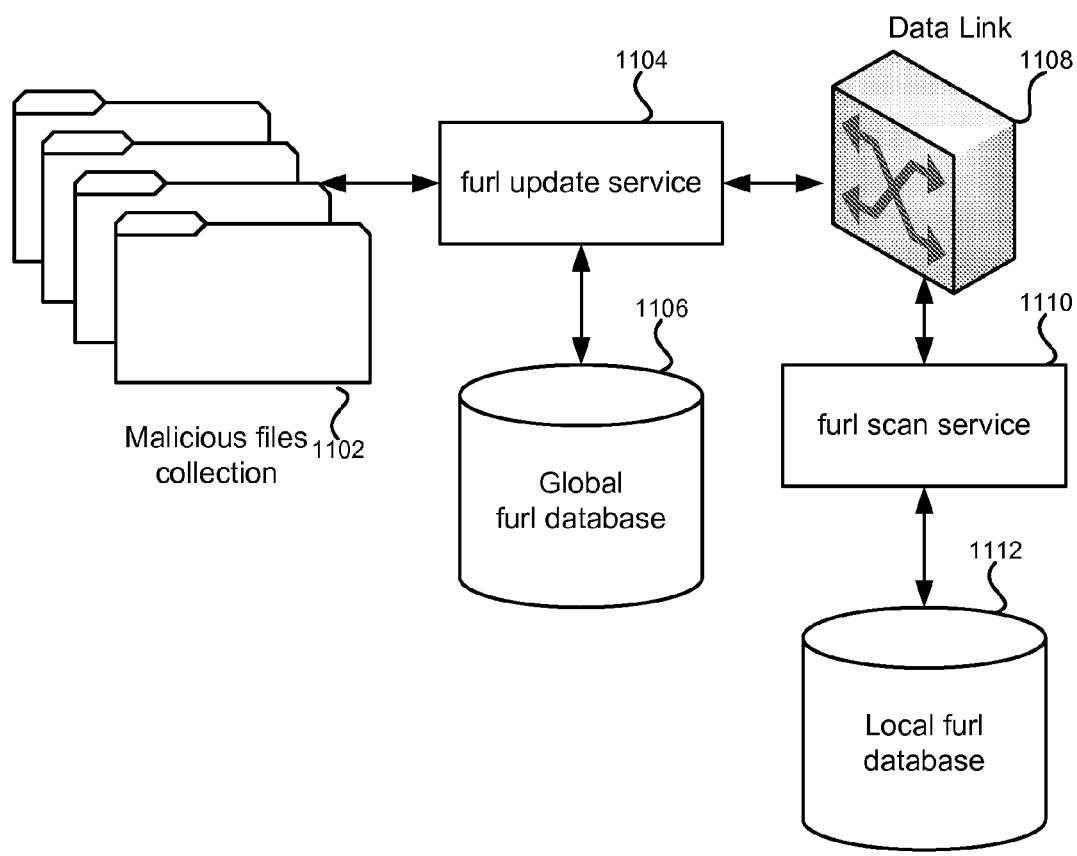
FIG. 11 illustrates elements in a system that uses furls to identify suspicious files.

FIG. 11 illustrates various elements of the system involved in the prior discussion. As shown in FIG. 11, a furl update service 1104 interfaces to a collection of malicious files 1102. The furl update service 1104 maintains a global database of furls 1106, which represents the latest updated collection of furls for malicious objects. The update service 1104, through a datalink 1108, communicates with a furl scan service 1110, located on a desktop computer of an analyst, another server, or a remote user. The furl scan service 1110 can have a local furl database 1112, which is typically periodically updated, to synchronize it to the global furl database 1106.

The approach described herein can be used to provide the analyst with a list of top 10 or top 20 files that the suspect file resembles. For example, if the distance calculated is borderline, somewhere around $K_N=0.02$ (or 2%), or a similar metric where it is difficult to conclude, without further manual analysis, whether the file contains a variant of a particular malicious object, the analyst can be presented with the top 10 list of the closest similar files, and can then compare them manually, this contrasted with a possibility of reviewing a very large number of files for similarity, or viewing the actual executable code in the suspect file.

If a file is identified as a possible malware-infected, in other words, having a borderline distance between it and the other files known to contain malicious objects, a more detailed computer analysis can be performed, such as more exhaustive signature searches, partial signature searches, etc.—many of these measures are time-consuming or calculation-intensive, and can rarely be performed on every suspect file, but they can be performed on a small subset of files identified by the heuristics described herein as likely infected, or borderline-likely-infected.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A computer-implemented method for identifying new modifications of a known malicious file, the method comprising:
   (a) dividing a received file into a plurality of N pieces;
   (b) for all of the N pieces, independently calculating an average byte value, wherein the average byte value is a sum of all values of all the bytes within the piece divided by a number of bytes in that piece;
   (c) generating a first furl of N elements in length, wherein each element of the first furl has a value that represents the average byte value of its corresponding file piece and is independent of values of other elements;
   (d) generating a second furl corresponding to the known malicious file;

(e) calculating a normalized distance ($K_N$) between the first furl and a the second furl based on differences between i-th elements of the furls and a maximum possible value of each furl element; and (f) based on the normalized distance ($K_N$), determining whether the received file is likely to be a modification of the known malicious file.

2. The method of claim 1, wherein the received file includes any of a trojan, a virus, a rootkit, worm, a byte sequence, a file, a plurality of packets, portion of a file, a preprocessed file.

3. The method of claim 1, further comprising selecting the second furl based on file size comparison.

4. The method of claim 3, wherein the file size comparison is based on whether or not the received file is packed.

5. The method of claim 1, wherein the furl elements are bytes.

6. The method of claim 1, wherein the distance is calculated based on any of sum of absolute value differences, root mean square difference and a correlation coefficient.

7. The method of claim 1, wherein the average byte value is any of an arithmetic average and a geometric average.

8. The method of claim 1, wherein the normalized distance ($K_N$) is calculated based on:

$$K_A = \sum_{i=1}^{N} |\Delta n_i|,$$

$$K_N = \frac{K_A * D}{M * N^2}$$

where $n_i$ is an average byte value of i-th piece of the file, $\Delta n_i$ is the difference between i-th elements of the furls, M is the maximum possible value of each furl element, and D is a number of elements of the two furls that are different.

9. The method of claim 1, wherein the normalized distance ($K_N$) is calculated based on:

$$K_A = \sum_{i=1}^{N} |\Delta n_i|,$$

$$K_N = \frac{K_A}{M * N}$$

where $n_i$ is—an average byte value of i-th piece of the file, $\Delta n_i$ is the difference between i-th elements of the furls, M is the maximum possible value of each furl element.

10. The method of claim 1, wherein steps (d)-(f) are performed for multiple files known to be malware files to identify a file likely to be closest to the file being analyzed.

11. A system for identifying new modifications of a known malicious file, the system comprising:

(a) a processor;

(b) a memory coupled to the processor;

(c) computer code loaded into the memory for implementing the following:

(d) the processor dividing a received file into a plurality of N pieces;

(e) for all of the N pieces, the processor independently calculating an average byte value, wherein the average byte value is a sum of all values of all the bytes within the piece divided by a number of bytes in that piece;

(f) a first furl of N elements in length, wherein each element of the first furl has a value that represents the average byte value of its corresponding piece and is independent of values of other elements;

(g) the processor generating a second furl corresponding to a known file;

(h) the processor calculating a normalized distance between the first furl and the second furl based on differences between i-th elements of the furls and a maximum possible value of each furl element; and (i) based on the normalized distance, the processor determining whether the received file is likely to be related to the known malicious file.

12. The system of claim 11, further comprising selecting the second furl based on received file size comparison.

13. The system of claim 12, wherein the received file size comparison is based on whether or not the received file is packed.

14. A computer-implemented method for identifying new modifications of known malware-carrying files, the method comprising:

(a) receiving a plurality of files to be analyzed for malware object presence;

(b) dividing each received file into N pieces;

(b) for each file, calculating an average byte value for all the pieces, wherein the average byte value is a sum of all values of all the bytes within the piece divided by a number of bytes in that piece;

(c) generating a furl for each file, wherein each element of the furl has a value that represents the average byte value of its corresponding file piece and is independent of values of other elements;

(d) of the generated furls, identifying, based on a normalized distance between furls, at least one previously calculated furl that corresponds to a file known to carry the malware object of the same family; and (e) warning a user regarding the identified malware-carrying file that corresponds to the generated furl.

15. A system for identifying new modifications of known malware-carrying files, the system comprising:

(a) storage for a plurality of files to be analyzed for malware object presence;

(b) each received file divided into N pieces;

(c) for each file, an average byte value calculated for all the pieces, wherein the average byte value is a sum of all values of all the bytes within the piece divided by a number of bytes in that piece;

(d) for each file, a processor generating a furl, wherein each element of the furl has a value that represents the average byte value of its corresponding file piece and is independent of values of other elements;

(e) a database of previously calculated furls that corresponds to the files known to carry the malware object;

(f) for each generated furl, the processor identifying, based on a normalized distance between furls, at least one previously calculated furl from the database that corresponds to a file known to carry the malware object of the same family; and (g) the processor communicating a notification, to a user, regarding the identified malware-carrying file that corresponds to the generated furl.

16. A non-transitory computer useable medium having computer executable program logic stored thereon, the computer executable program logic executing on a processor for analysis of suspect received files for malware presence, the computer program logic comprising:

(a) computer program code means for dividing a received file into a plurality of N pieces;
(b) for all of the N pieces, computer program code means for independently calculating an average byte value, wherein the average byte value is a sum of all values of all the bytes within the piece divided by a number of bytes in that piece;
(c) computer program code means for generating a furl of N elements in length, wherein each element of the furl has a value that represents the average byte value of its corresponding received file piece and is independent of values of other elements;
(d) computer program code means for calculating a normalized distance between the furl and another existing furl corresponding to a file known to be a malware data object; and
(e) computer program code means for, determining, based on the normalized distance, whether the received file is likely to be a malicious object.

* * * * *